United States Patent
Adachi et al.

[19]

[11] Patent Number: 6,025,901
[45] Date of Patent: Feb. 15, 2000

[54] LIQUID CRYSTAL DISPLAY DEVICE AND METHOD FOR PRODUCING THE SAME

[75] Inventors: Masahiro Adachi, Nara; Yasuyoshi Kaise, Tenri; Jun Koyama, Sagamihara; Toshimitsu Konuma, Atsugi; Shunpei Yamazaki, Setagaya-ku, all of Japan

[73] Assignees: Sharp Kabushiki Kaisha, Osaka; Semiconductor Energy Laboratory Co. Ltd., Kanagawa, both of Japan

[21] Appl. No.: 08/695,595

[22] Filed: Aug. 12, 1996

[30] Foreign Application Priority Data

Aug. 14, 1995 [JP] Japan ................................. 7-207206
Aug. 30, 1995 [JP] Japan ................................. 7-222423

[51] Int. Cl.[7] ................................................ G02F 1/1345
[52] U.S. Cl. .......................... 349/151; 349/152; 349/158
[58] Field of Search ............................... 349/149, 58, 150, 349/151, 158, 152; 345/206; 361/681, 785; 439/59, 62, 65–69, 74, 79; 174/253, 255–261; 445/24, 25

[56] References Cited

U.S. PATENT DOCUMENTS

| | | | |
|---|---|---|---|
| 4,862,153 | 8/1989 | Nakatani et al. | 349/150 |
| 5,130,832 | 7/1992 | Kawaguchi et al. | 349/151 |
| 5,233,451 | 8/1993 | Iguchi | 349/152 |
| 5,442,470 | 8/1995 | Hashimoto | 349/149 |
| 5,670,994 | 9/1997 | Kawaguchi et al. | 349/150 |
| 5,694,190 | 12/1997 | Matsumoto et al. | 349/58 |

FOREIGN PATENT DOCUMENTS

| | | | |
|---|---|---|---|
| 4-037725 | 2/1992 | Japan | 349/150 |
| 4-304427 | 10/1992 | Japan | 349/150 |
| 4-324826 | 11/1992 | Japan . | |

*Primary Examiner*—Hung Xuan Dang
*Assistant Examiner*—Tai V. Duong
*Attorney, Agent, or Firm*—Nixon & Vanderhye, P.C.

[57] ABSTRACT

The liquid crystal display device of the invention includes: a first substrate having a first surface, a second surface and at least four side surfaces; a second substrate having a surface opposed to the first surface of the first substrate; a liquid crystal layer interposed between the first surface of the first substrate and the surface of the second substrate; a plurality of pixel electrodes; a plurality of switching elements, each of the switching elements supplying a signal to a corresponding one of the plurality of pixel electrodes; drivers for driving the plurality of switching elements; and a controller for controlling the driver. In the liquid crystal display device, the drivers are provided on the first surface of the first substrate, and the controller is provided above the second surface of the first substrate.

25 Claims, 12 Drawing Sheets

LIQUID CRYSTAL DISPLAY DEVICE AND METHOD FOR PRODUCING THE SAME

BACKGROUND OF THE INVENTION

1. Field of the Invention

The present invention relates to a liquid crystal display device. More specifically, the present invention relates to a method for disposing a controller which controls a driver supplying a signal to pixel electrodes of a liquid crystal display device and a connection structure for the driver and the controller.

2. Description of the Related Art

An exemplary configuration for a conventional liquid crystal display device (LCD) will be described with respect to a TFT-LCD or an active matrix type LCD using a plurality of thin-film transistors (TFTs).

Figures 1, 1A:
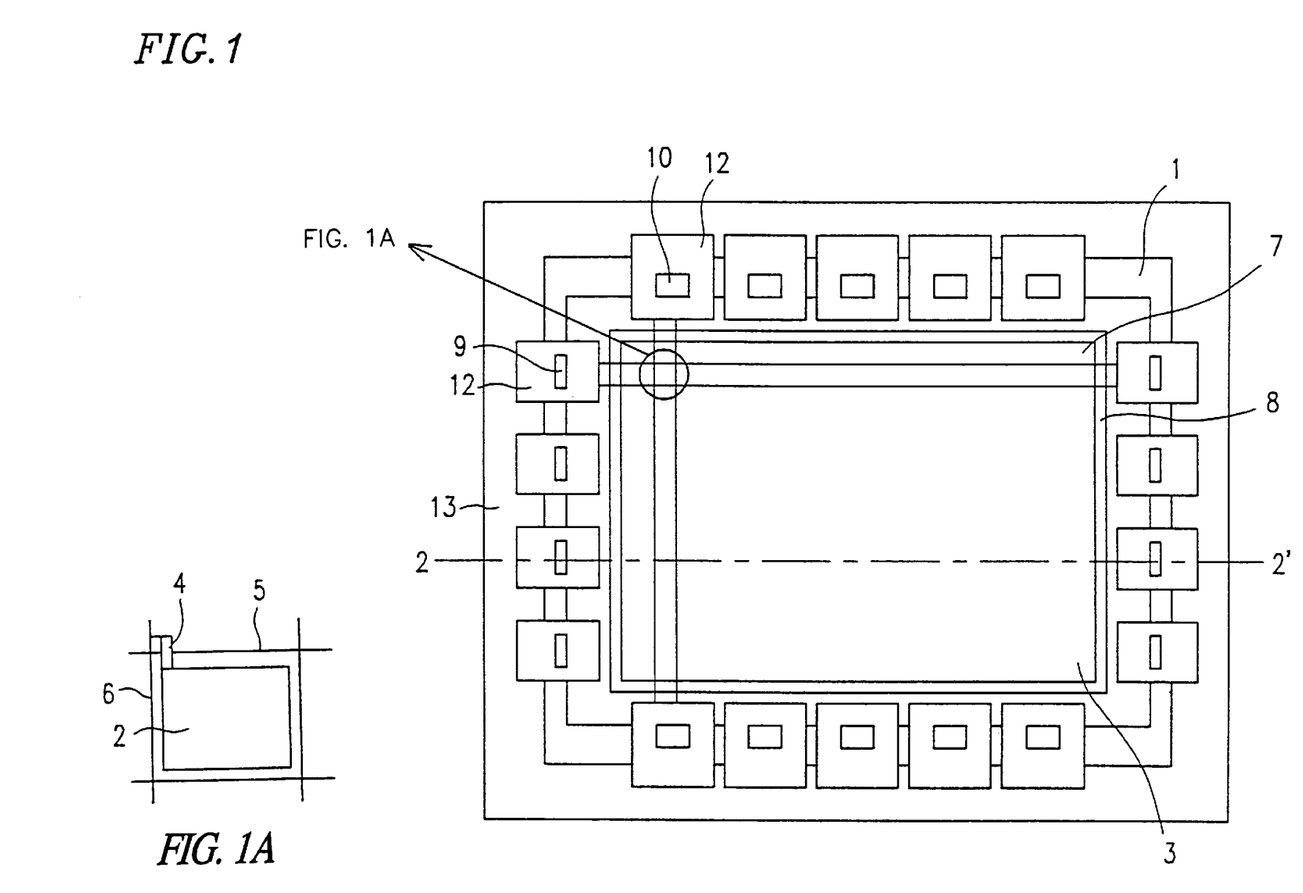
FIG. 1 is a plan view of a conventional liquid crystal display device as seen from above.
FIG. 1A is an enlarged view of the circled area in FIG. 1.
Figure 2:
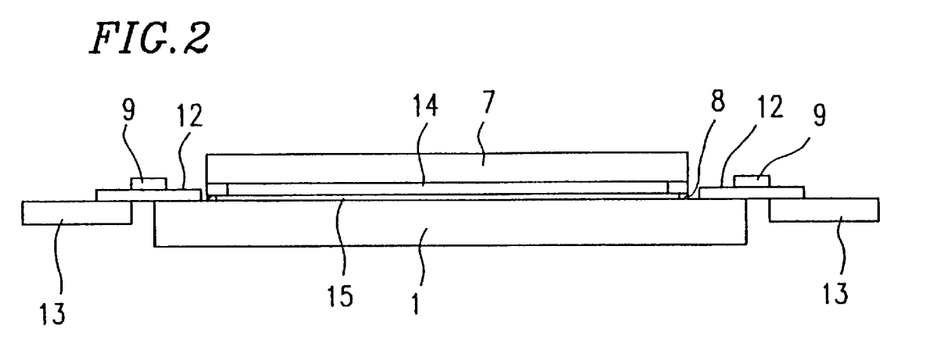
FIG. 2 is a cross-sectional view taken along the line 2–2' of the liquid crystal display device shown in FIG. 1.

FIG. 1 is a plan view of a conventional liquid crystal display device as seen from above, while FIG. 2 is a cross-sectional view taken along the line 2–2' of the liquid crystal display device shown in FIG. 1.

As shown in FIG. 2, liquid crystal is sandwiched between a first insulating substrate 1 and a second insulating substrate 7 which are made of glass, quartz or the like. As shown in the magnified view on the left of FIG. 1: a pixel electrode 2, a TFT 4, a gate bus 5 for scanning the TFT 4, and a source bus 6 for supplying an image signal to the pixel electrode 2 via the TFT 4, are formed as a unit on the upper surface of the first insulating substrate 1 and a plurality of such units are arranged in matrix on the surface of the first insulating substrate 1.

The upper surface of the first insulating substrate 1 is opposed to the lower surface of the second insulating substrate 7 with a predetermined gap therebetween. A counter electrode 14 is formed on the lower surface of the second insulating substrate 7. A region in which the counter electrode 14 is formed and an image is displayed will be herein called a "screen region" 3. The first and the second insulating substrates 1 and 7 are adhered to each other via a seal member 8.

Around the screen region 3, a plurality of gate drivers 9 each supplying a scanning signal to the corresponding gate bus 5, and a plurality of data drivers 10 each supplying an image signal to the corresponding source bus 6, are provided. Each of these drivers 9 and 10 is mounted on a carrier tape 12 having two flexible electrode lines. One of the two flexible electrode lines is connected to a terminal of the gate bus 5 or a terminal of the source bus 6 via an anisotropic conductive film, while the other flexible electrode line is connected to a control circuit board 13.

A controller formed on the control circuit board 13 converts an image signal such as a video signal into an image signal which can be displayed on a liquid crystal display device. The image signal obtained by the conversion is output to the drivers 9 and 10 via the carrier tapes 12.

Various methods are used for mounting the drivers, for example:

(1) A method in which a carrier tape is used;
(2) A chip-on-glass (COG) method in which an LSI chip for drivers is directly connected to the gate bus terminal or the source bus terminal of a liquid crystal display device; and
(3) A monolithic method in which drivers and TFTs are formed on the same insulating substrate by utilizing a process for forming TFTs switching the respective pixels on the screen.

According to any of these methods (1) to (3), the drivers and the controller are required to be connected to each other. For connecting the drivers and the controller thereof, a method for connecting flexible electrode lines thereto with an anisotropic conductive film or solder or a method for connecting them by means of wire bonding is used, for example.

An exemplary monolithic method is described in Japanese Laid-Open Patent Publication No. 4-324826, in which a technology for reducing the area around the screen by superposing the drivers and a seal resin by the use of monolithic drivers is disclosed.

As an exemplary driver monolithic type liquid crystal display device, there is an active matrix type liquid crystal display device using polycrystalline silicon transistors. Since the mobility of a polycrystalline silicon driver is relatively high, it is possible to form a display section and a peripheral driver section on the same substrate.

Such a driver monolithic type liquid crystal display device has recently been put into practical use as a video view finder, a light valve for a liquid crystal projector or the like.

Figure 3:
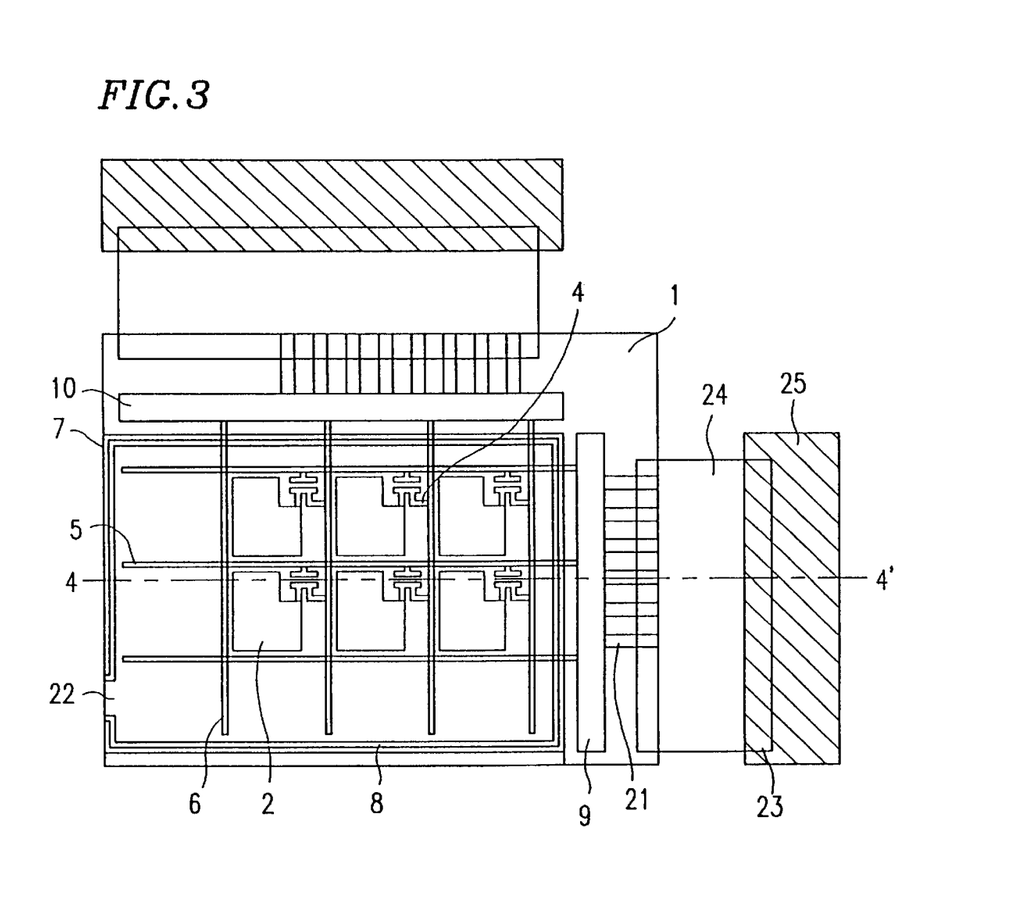
FIG. 3 is a plan view of a conventional driver monolithic type liquid crystal display device as seen from above.
Figure 4:
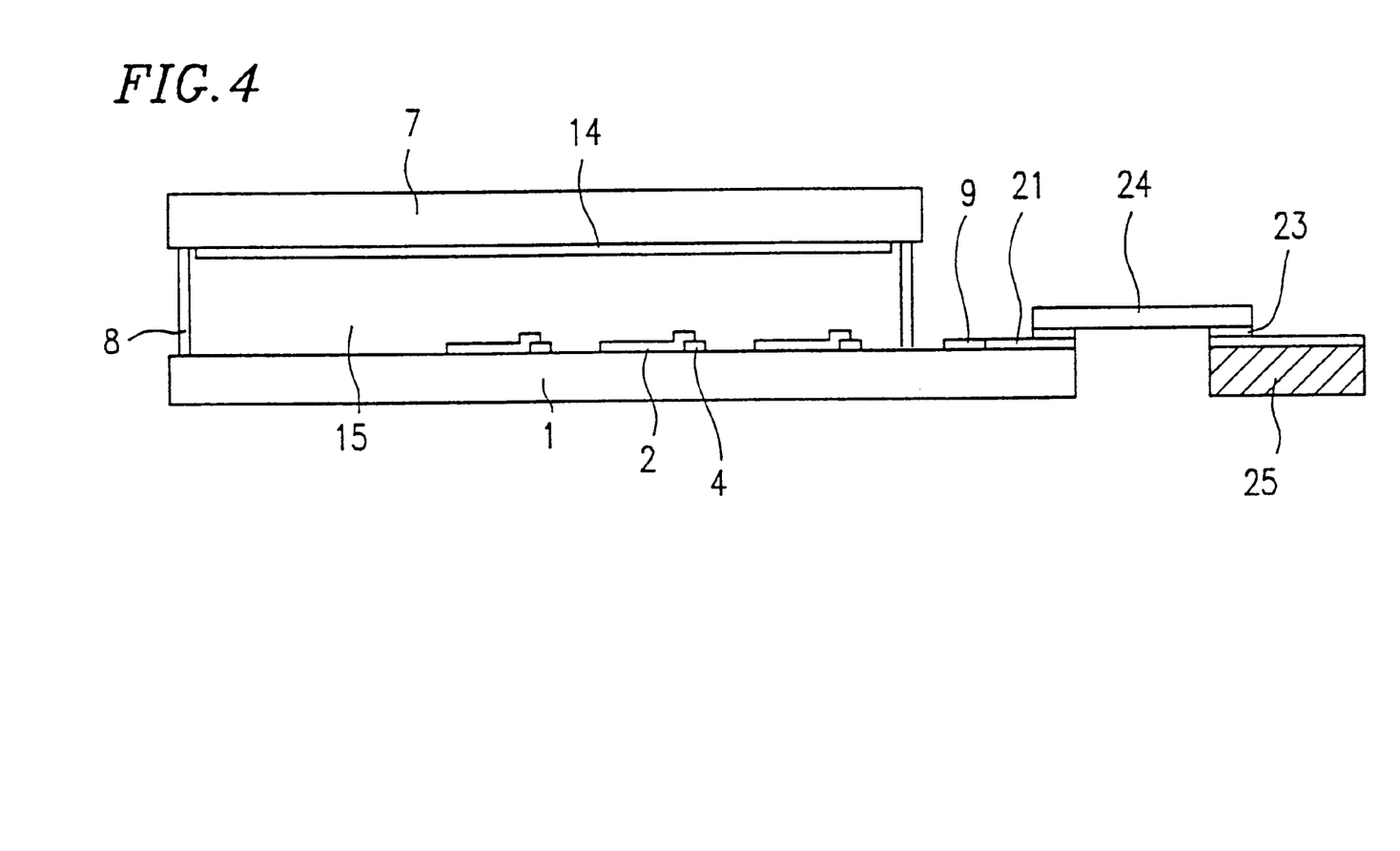
FIG. 4 is a cross-sectional view taken along the line 4–4' of the liquid crystal display device shown in FIG. 3.

FIGS. 3 and 4 show a conventional driver monolithic type liquid crystal display device: FIG. 3 is a plan view of the driver monolithic type liquid crystal display device as seen from above, while FIG. 4 is a cross-sectional view taken along the line 4–4' of the liquid crystal display device shown in FIG. 3.

In this liquid crystal display device, two insulating substrates 1 and 7 for forming a liquid crystal panel are disposed so as to face each other via a predetermined gap therebetween. The insulating substrates 1 and 7 are connected via a seal member 8 provided around the peripheral portions thereof. Liquid crystal 15 is injected through an injection hole 22 into the space formed by the insulating substrates 1 and 7 and the seal member 8 and then sealed.

The liquid crystal display device shown in FIG. 3 is an active matrix type liquid crystal display device. On the upper surface of the first insulating substrate 1, a plurality of gate buses 5 and a plurality of source buses 6 are provided so as to cross each other and a plurality of TFTs 4 and a plurality of pixel electrodes 2 are formed in matrix.

The gate buses 5 are extended transversely through the seal member 8 to be connected to the output terminals of the gate drivers 9, while the source buses 6 are also extended transversely through the seal member 8 to be connected to the output terminals of the source drivers 10.

External input terminals 21 are provided on the surface of the first insulating substrate 1 so as to run from the drivers 9 and 10 towards the corresponding end faces of the substrate and are exposed thereon.

A counter electrode 14 is formed on the lower surface of the second insulating substrate 7. A plurality of pixel electrodes 2 are formed on the upper surface of the first insulating substrate 1 so as to face the counter electrode 14.

The external input terminals 21 formed on the upper surface of the first insulating substrate 1 are connected to the output terminals of external circuit boards 25 via film carrier tapes 24. In a conventional liquid crystal display device, the external circuit boards 25 on each of which a controller is mounted are connected to the corresponding drivers 9 and 10 by utilizing a TAB technology.

By downsizing a liquid crystal display device, a liquid crystal display device application product such as a computer or a word processor can also be downsized. It is particularly necessary to reduce the area of the peripheral portion around the screen of a liquid crystal display device which does not contribute to the display of an image.

However, in the above-described method in which a carrier tape having flexible electrode lines is used, if the connection area between the carrier tape and a driver or the connection area between the carrier tape and a controller is reduced, then a sufficient adhesion strength cannot be obtained therebetween. Therefore, a certain area is required for connecting the carrier tape to the driver or connecting the carrier tape to the controller and the area of the peripheral portion around the screen cannot be reduced without limit.

SUMMARY OF THE INVENTION

According to the present invention, a liquid crystal display device is provided. The liquid crystal display device includes: a first substrate having a first surface, a second surface and at least four side surfaces; a second substrate having a surface opposed to the first surface of the first substrate; a liquid crystal layer interposed between the first surface of the first substrate and the surface of the second substrate; a plurality of pixel electrodes; a plurality of switching elements, each of the switching elements supplying a signal to a corresponding one of the plurality of pixel electrodes; drivers for driving the plurality of switching elements; and a controller for controlling the drivers. In the liquid crystal display device, the drivers are provided on the first surface of the first substrate, and the controller is provided above the second surface of the first substrate.

In one embodiment, the liquid crystal display device further includes a plurality of connection lines which are used by the controller for supplying to the drivers a signal for controlling the drivers, a part of the plurality of connection lines being located on at least one of the at least four side surfaces.

In another embodiment, at least one of an edge portion in which at least one of the at least four side surfaces and the first surface of the first substrate cross is chamfered, and an edge portion in which at least one of the at least four side surfaces and the second surface of the first substrate cross is chamfered.

In still another embodiment, the connection lines are printed wiring.

In still another embodiment, the printed wiring is made of carbon paste.

In still another embodiment, the printed wiring is made of silver paste.

In still another embodiment, the controller is adhered to a peripheral portion other than a screen region above the second surface of the first substrate.

In still another embodiment, the controller is provided on a control substrate, which is adhered to a peripheral portion other than a screen region above the second surface of the first substrate.

In still another embodiment, the control substrate is connected to the second surface of the first substrate via an anisotropic conductive film.

In still another embodiment, the control substrate is connected to the second surface of the first substrate via solder.

In still another embodiment, the driver is formed on the first surface of the first substrate by a monolithic method.

In still another embodiment, the driver is formed on the first surface of the first substrate by a COG method.

In still another embodiment, the connection lines are coated with a resin.

In still another embodiment, the controller is provided on an external circuit board which is in contact with the second surface of the first substrate and a cover for fixing the external circuit board and the first substrate is further provided for the liquid crystal display device.

In still another embodiment, the cover is an engageable connector.

In still another embodiment, the cover electrically connects the controller and the driver to each other.

In still another embodiment, the cover is made of plastic.

In still another embodiment, the edge portions of the first substrate have a taper shape.

In still another embodiment, the external circuit board is a printed wiring board.

In still another embodiment, the external circuit board is provided so as to face the drivers via the first substrate.

According to another aspect of the present invention, a method for producing a liquid crystal display device is provided, the liquid crystal display device including: a first substrate having a first surface, a second surface and at least four side surfaces; a second substrate having a surface opposed to the first surface of the first substrate; a liquid crystal layer interposed between the first surface of the first substrate and the surface of the second substrate; a plurality of pixel electrodes; a plurality of switching elements, each of the switching elements supplying a signal to a corresponding one of the plurality of pixel electrodes; drivers for driving the plurality of switching elements; and a controller for controlling the drivers. The method includes the steps of: providing the drivers on the first surface of the first substrate; providing the controller above the second surface of the first substrate; and connecting the drivers to the controller.

In one embodiment, the step of connecting the drivers to the controller further includes a step of printing a plurality of connection lines on at least one of the at least four side surfaces.

According to the present invention, by providing drivers and a controller on different surfaces of the same substrate, the area of the peripheral region other than the liquid crystal display screen region can be reduced, so that it is possible to downsize a liquid crystal display device. As a result, a liquid crystal display device application product such as a personal computer, a word processor, a projector or a TV set can also be downsized, whereby remarkable industrial effects can be attained.

According to the present invention, the proportion of a region not contributing to image display (e.g., a mounting region used for connecting a substrate on which drivers are formed to external circuit boards) to the entire liquid crystal display device can be reduced, so that a liquid crystal display device can be downsized.

Since the light incoming through the reverse surface of the substrate can be blocked by a printed wiring board (PWB), it is possible to prevent light from incoming into a driver portion and thereby to reduce an optically excited current flowing through a TFT. Consequently, the element characteristics and reliability can be improved and the display definition of a liquid crystal display device can be increased. The present invention is particularly effectively applicable to various liquid crystal display devices (such as a light valve for a liquid crystal projector) to which intense light is irradiated through the reverse side of the substrate. In addition, as compared with conventional mounting methods, the mounting process can be simplified and costs required for mounting can be reduced, so that the costs of a liquid crystal display device can be reduced. Moreover, an engageable connector can be used as a protective frame for a liquid crystal display device, thereby further downsizing a liquid crystal display device.

Thus, the invention described herein makes possible the advantage of downsizing a liquid crystal display device by reducing the area of a peripheral region around the screen.

This and other advantages of the present invention will become apparent to those skilled in the art upon reading and understanding the following detailed description with reference to the accompanying figures.

BRIEF DESCRIPTION OF THE DRAWINGS

FIG. 5A is a plan view of a liquid crystal display device in a first example of the present invention as seen from above, while

FIG. 13A is a plan view of a liquid crystal display device in a second example of the present invention as seen from above, while

DESCRIPTION OF THE PREFERRED EMBODIMENTS

EXAMPLE 1

Figure 5A:
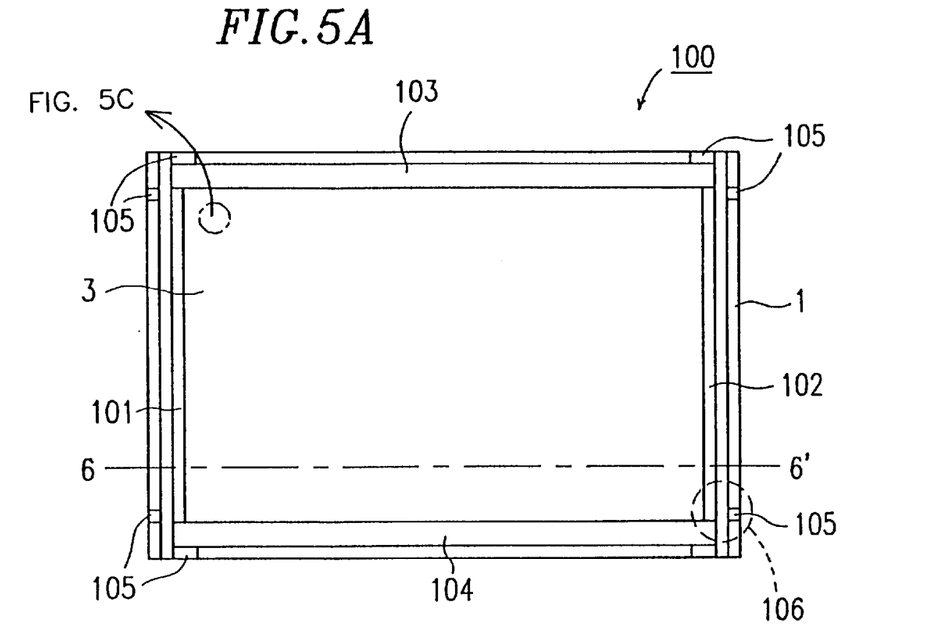
Figure 5B:
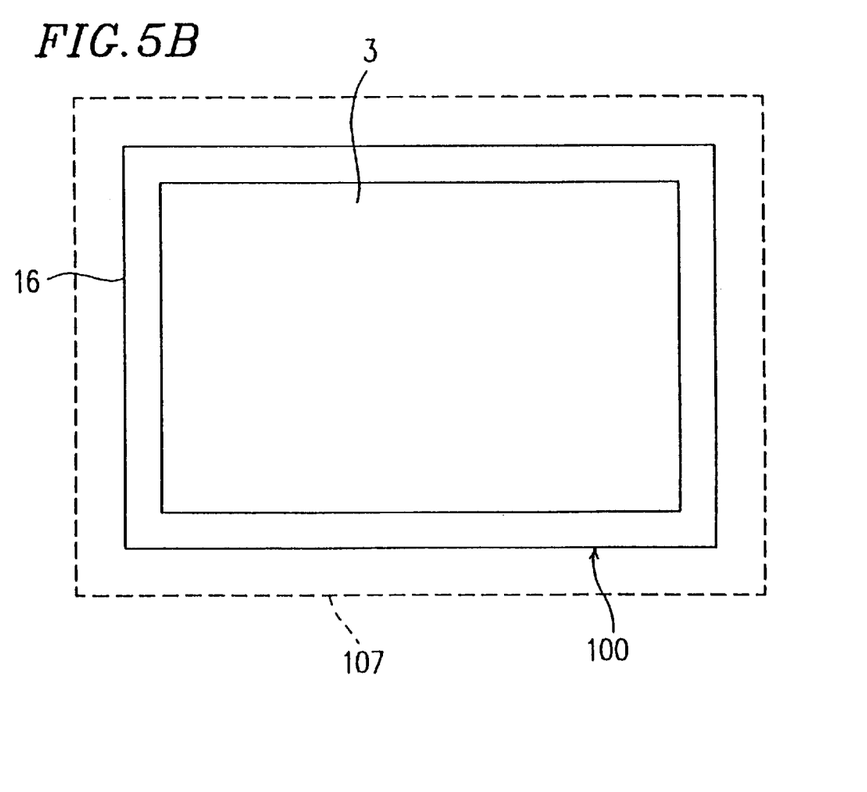
FIG. 5B is a plan view of the liquid crystal display device shown in FIG. 5A as seen from below.
Figure 5C:
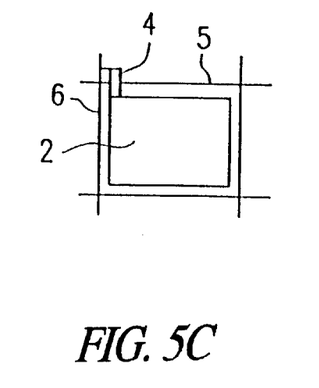
FIG. 5C is an enlarged view of the circled area in FIG. 5.
Figure 6:
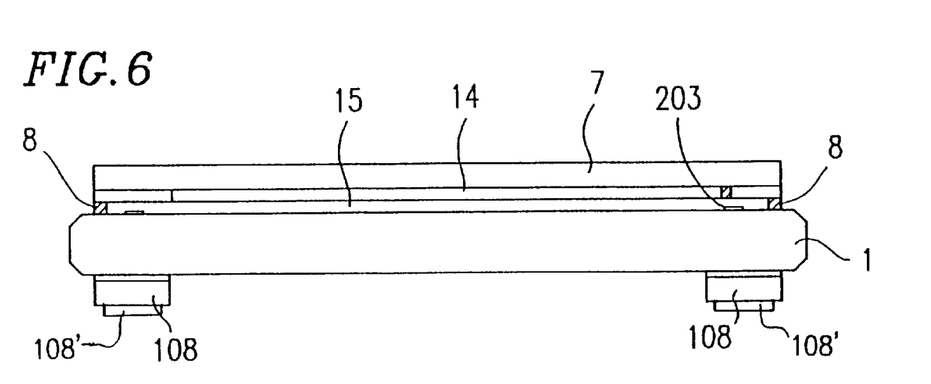
FIG. 6 is a cross-sectional view taken along the line 6–6' of the liquid crystal display device shown in FIG. 5A.

Hereinafter, the configuration of a liquid crystal display device in a first example of the present invention will be described with reference to FIGS. 5A, 5B and 6. FIG. 5A is a plan view of a liquid crystal display device 100 in the first example as seen from above, while FIG. 5B is a plan view of the liquid crystal display device shown in FIG. 5A as seen from below. FIG. 6 is a cross-sectional view taken along the line 6–6' of the liquid crystal display device shown in FIG. 5A.

The liquid crystal display device shown in FIG. 5A includes a first insulating substrate 1 and a second insulating substrate 7, at least one of which is a transparent substrate and both of which are made of glass, quartz or the like. Each of the insulating substrates 1 and 7 has an upper surface, a lower surface and at least four side surfaces.

As shown in FIG. 6, liquid crystal 15 is sandwiched between the upper surface of the first insulating substrate 1 and the lower surface of the second insulating substrate 7. As shown in the magnified view on the left of FIG. 5A, a pixel electrode 2; a switching element 4 such as a thin film transistor (TFT); a gate bus 5 through which a scanning signal for scanning the switching element 4 passes; and a source bus 6 for supplying an image signal to the pixel electrode 2 via the switching element 4 are formed as a unit on the upper surface of the first insulating substrate 1 and a plurality of such units are arranged in matrix on the surface of the first insulating substrate 1.

The gate buses 5 and the source buses 6 are extended and connected to the output terminals of the corresponding drivers (not shown), respectively. The drivers may be formed simultaneously with the switching elements 4 forming the pixels and the like by patterning or the like.

The upper surface of the first insulating substrate 1 is opposed to the lower surface of the second insulating substrate 7. A counter electrode 14 is formed on the lower surface of the second insulating substrate 7. A region in which an image is displayed will herein be called a "screen region" 3. The first and the second insulating substrates 1 and 7 are adhered to each other via a seal member 8. The seal member 8 is provided in a band shape along the peripheral region of the second insulating substrate 7 by a screen printing method or the like.

An ultraviolet curable resin, a thermosetting resin or the like can be used as the seal member 8. Liquid crystal 15 has been injected through an injection hole (not shown) into the gap between the substrates which is surrounded by the seal member 8 and then sealed up.

In the first example shown in FIG. 5A, monolithic drivers 101, 102, 103 and 104 are formed on the first insulating substrate 1. In one embodiment, the monolithic driver 101 located on the left side of the screen 3 may be a gate driver; the monolithic driver 102 located on the right side of the screen 3 may be a gate driver; the monolithic driver 103 located on the upper side of the screen 3 may be a source driver; and the monolithic driver 104 located on the lower side of the screen 3 may be a source driver.

The gate driver generates a scanning signal and then supplies the generated scanning signal to the gate buses 5, while the source driver generates an image signal and then supplies the generated image signal to the source buses 6.

The gate driver and the source driver are controlled by a controller (not shown) formed on a control circuit board 16. The controller converts an image signal such as a video signal into an image signal which can be displayed on a liquid crystal display device.

Figure 7:
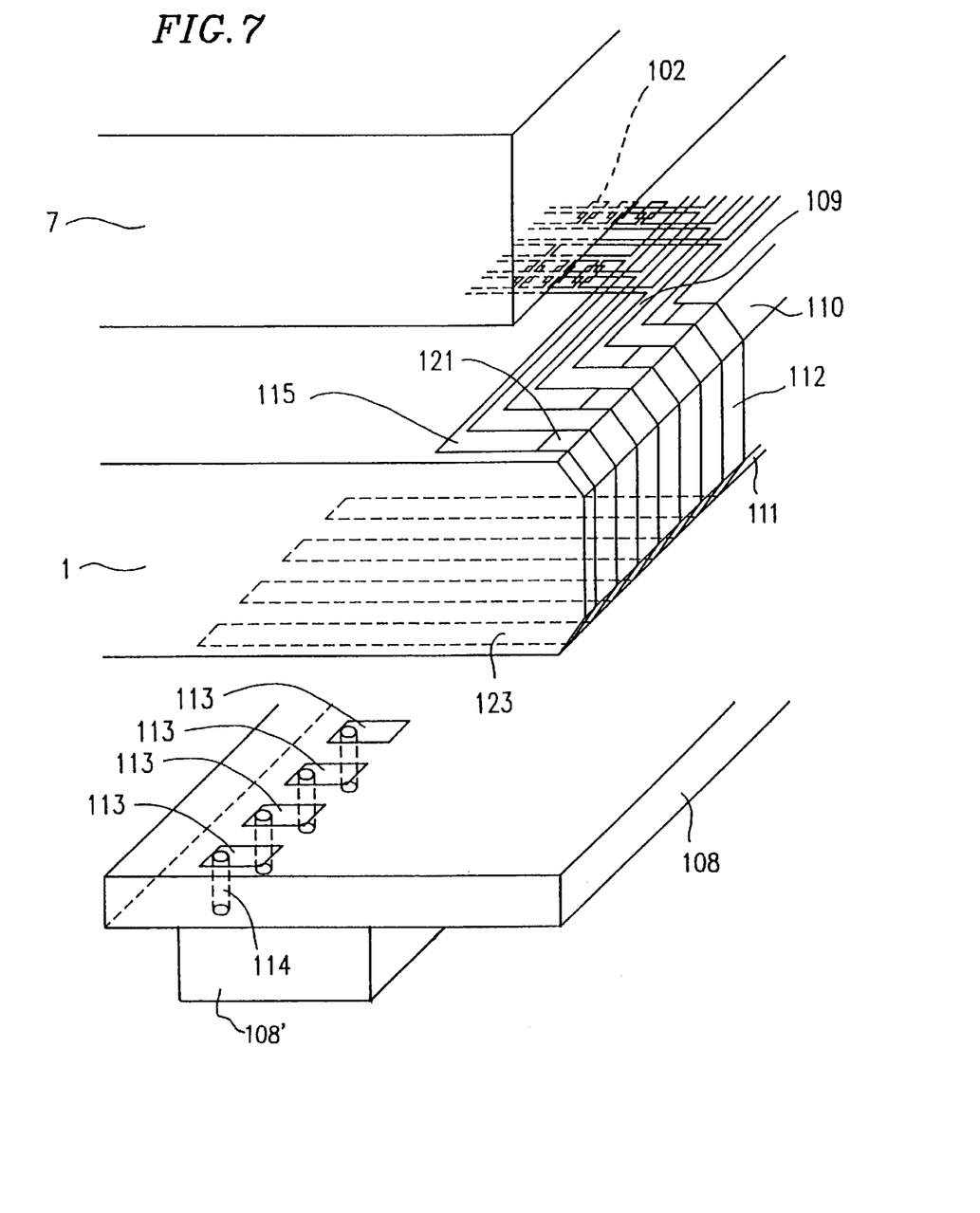
FIG. 7 is an exploded and enlarged perspective view showing a part of the liquid crystal display device shown in FIG. 5A.

Connection lines (not shown) in the form of a printed wiring made of carbon paste or the like are used as the signal lines and the power supply lines for the drivers 101, 102, 103 and 104. The connection lines are extended to the lower surface via the side surfaces of the first insulating substrate 1 so as to be connected to the controller (not shown) for controlling the drivers. The number of connection lines 112 as shown in FIG. 7 forming one group 105 is in an approximate range of 10 to 20. In FIG. 5A, two groups 105 of connection lines 112 are provided at each of the four corners, i.e., eight groups in total. However, in the liquid crystal display device of the present invention, the number and the positions of the groups 105 are not limited to those shown in FIG. 5A, but are variable depending upon the number and the positions of the pixels.

FIG. 7 is an exploded and enlarged perspective view showing a part of the liquid crystal display device 100. A TFT active matrix (not shown); a plurality of monolithic drivers 102 for supplying a scanning signal and/or an image signal to the switching elements; input signal lines and power lines 109 for supplying a signal and power to the monolithic drivers 102 are formed on the upper surface (or the first surface) of the first insulating substrate 1. The line width of the input signal lines and power lines 109 is about 0.1 mm. The top end of each of the input signal lines and power lines 109 is connected to a connection terminal 115. The line width of the connection terminal 115 is about 1 mm.

The second insulating substrate 7 provided with a counter electrode (not shown) is disposed above the first insulating substrate 1 and liquid crystal 15 (not shown) is interposed between the two insulating substrates 1 and 7. In this example, the corner between a side surface and the upper surface of the first insulating substrate 1 and the corner between a side surface and the lower surface of the first insulating substrate 1 are chamfered, so that an upper chamfered portion 110 and a lower chamfered portion 111 are formed.

In the case where the thickness of the first insulating substrate 1 is about 1 mm, the width of the upper chamfered portion 110 and the lower chamfered portion 111 is preferably in an approximate range of 0.1 to 0.2 mm. After chamfering is finished, the connection lines 112 are printed on the side surface of the first insulating substrate 1. The connection lines 112 may be made of any arbitrary conductive ink such as carbon paste, silver paste or the like. In this example, the connection lines are assumed to be made of carbon paste and will be called "carbon paste connection lines" 112.

The carbon paste connection lines 112 are printed on the exposed connection terminals 115. It is noted that the connection terminals 115 may be connected to the connection lines 112 via an anisotropic conductive film (not shown). By chamfering the first insulating substrate 1, it is possible to prevent the carbon paste connection lines 112 from being disconnected in the edge portions of the first insulating substrate 1. It is noted that such chamfering may be performed in only the portion where the connection lines 112 are provided.

A control circuit board 108 on which a controller 108' for controlling the drivers is mounted is adhered to the peripheral region other than the screen region 3 on the lower surface (second surface) of the first insulating substrate 1. A control circuit board having substantially the same configuration as that of a conventional control circuit board may be used as the control circuit board 108. Nevertheless, it is preferable to reduce the size of the control circuit board 108 by increasing the density at which the elements forming the control circuit board are mounted as compared with a conventional control circuit board.

Electrode pads 113 are provided on the upper surface of the control circuit board 108 which is opposed to the lower surface of the first insulating substrate 1. The electrode pads 113 on the control circuit board 108 come into contact with the carbon paste connection lines 112 on the first insulating substrate 1, so that the electrode pads 113 and the carbon paste connection lines 112 are electrically connected to each other. Each of the electrode pads 113 is connected to the controller 108' mounted on the lower surface of the control circuit board 108 via a through hole 114 provided through the control circuit board 108.

Figure 8:
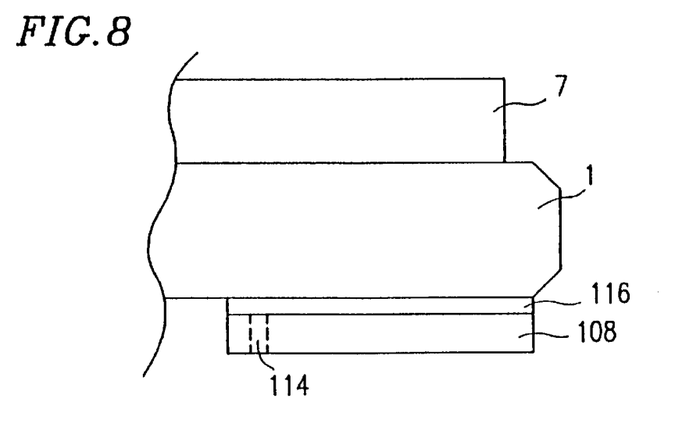
FIG. 8 is a schematic cross-sectional view showing an exemplary connection structure in the first example of the present invention.

It is noted that the carbon paste connection lines 112 printed on the first insulating substrate 1 may be connected to the electrode pads 113 on the control circuit board 108 via an anisotropic conductive film 116 as shown in FIG. 8. Alternatively, the carbon paste connection lines 112 printed on the first insulating substrate 1 may be connected to the electrode pads 113 on the control circuit board 108 via some connection medium such as solder instead of the anisotropic conductive film 116.

Figure 9:
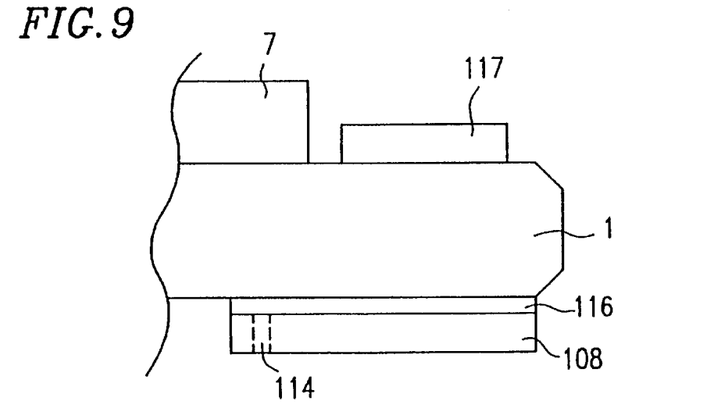
FIG. 9 is a schematic cross-sectional view showing another exemplary connection structure in the first example of the present invention.

In this example, a liquid crystal display device in which drivers are formed in a monolithic manner on the first insulating substrate 1 has been described. Also described was that the first insulating substrate 1 and the control circuit board 108 are connected via carbon paste connection lines 112. The drivers 117 may be mounted in a COG manner on the first insulating substrate 1, the first insulating substrate 1 and the control circuit board 108 may also be connected via an anisotropic conductive film 116 as shown in FIG. 9.

The material for the connection lines 112 formed on the side surface of the first insulating substrate 1 is not limited to carbon paste but may be any other conductive material such as silver paste so long as the material is usable in a printing method.

Figure 10:
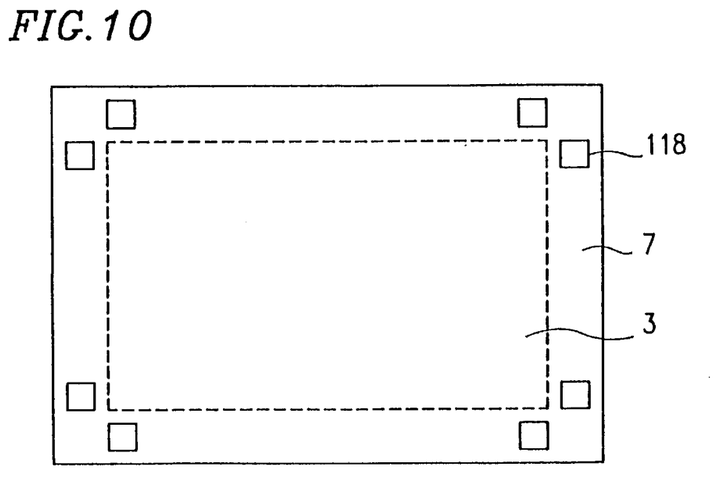
FIG. 10 is a plan view showing another exemplary connection structure in the first example of the present invention.
Figure 11:
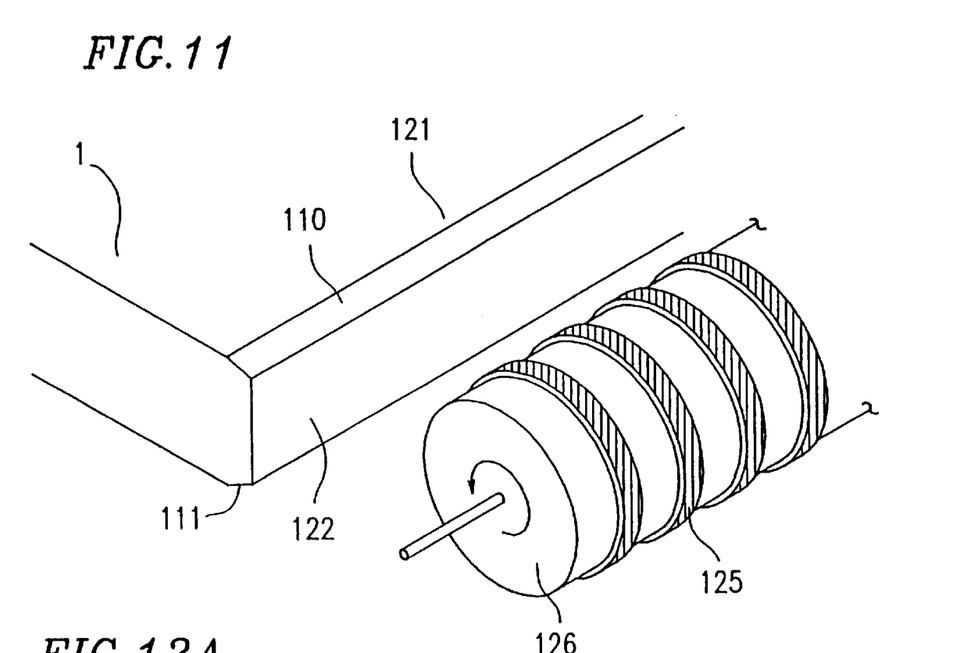
FIG. 11 is a perspective view illustrating a process step for producing the liquid crystal display device according to the.present invention.

FIG. 10 is a plan view of the liquid crystal display device of the present invention as seen from below. As shown in FIG. 10, in place of the control circuit board 108, driver chips 118 may be directly secured to the regions other than the screen region 3 on the lower surface of the first insulating substrate 1 via an adhesive or the like and may be directly connected to the connection lines 112.

Moreover, it is preferable that the connection lines 112 are coated with a resin such as epoxy resin for protecting the connection lines 112.

In the first example, a case where an insulating substrate (made of glass, quartz or the like) is used as both the first substrate on which an active matrix and drivers are formed and the second substrate having a counter electrode thereon (i.e., a transmission type liquid crystal display device) has been described. However, the liquid crystal display device according to the present invention may also be usable as a reflection type liquid crystal display device.

It is noted that the controller may be located on the first or the second surface of the first insulating substrate other than the screen region. In other words, the controller may be located on the first or the second surface of the first insulating substrate other than the region for the pixel electrodes.

Hereinafter, an exemplary method for forming the connection lines 112 by printing will be described with reference to FIGS. 11 and 12A to 12C.

Figure 12A:
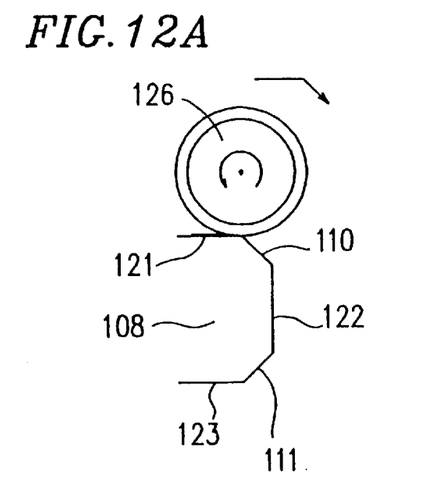
FIGS. 12A, 12B and 12C are cross-sectional views showing the respective process steps for producing the liquid crystal display device according to the present invention.

First, as shown in FIG. 12A, while rotating a roller 126, around the surface of which conductive ink (such as carbon paste) 125 has been attached, the roller 126 is made to come into contact with the upper surface of the first insulating substrate 1, which has been chamfered beforehand, around an upper end portion 121 thereof. The end portion 121 partially overlaps the connection terminals 115 as shown in FIG. 7, so that the conductive ink 125 is electrically connected to the connection lines 112.

Figure 12B:
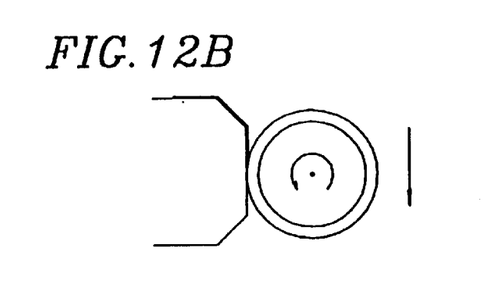
Figure 12C:
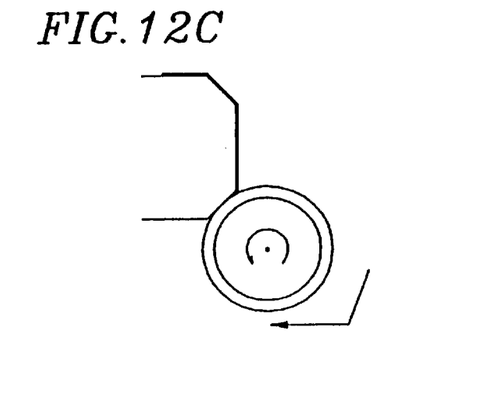

As shown in FIG. 12B, while rotating, the roller 126 passes the upper chamfered portion 110 to reach the side surface 122. Next, as shown in FIG. 12C, while rotating, the roller 126 reaches the lower chamfered portion 111 and then reaches a lower portion 123 of the first insulating substrate 1. As a result, the conductive ink is printed in a region on the surfaces of the first insulating substrate 1 ranging from the upper end portion 121 to the lower portion 123 via the side surface 122.

The conductive ink material is not limited to carbon paste, but may be any other conductive material such as silver paste so long as the material can be used in a printing method. Also, it is preferable that the lines are coated with epoxy resin or the like after the printing.

EXAMPLE 2

Hereinafter, a configuration for a liquid crystal display device in the second example of the present invention will be described with reference to FIGS. 13A and 13B, in which the same components as those of the liquid crystal display device shown in FIG. 3 will be identified by the same reference numerals and the description thereof will be fundamentally omitted.

Figure 13A:
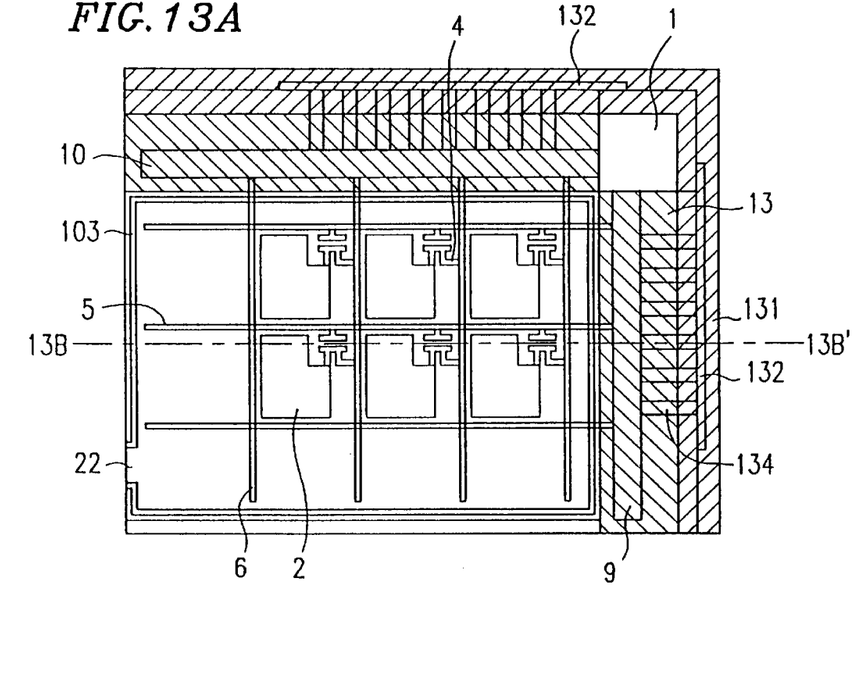
Figure 13B:
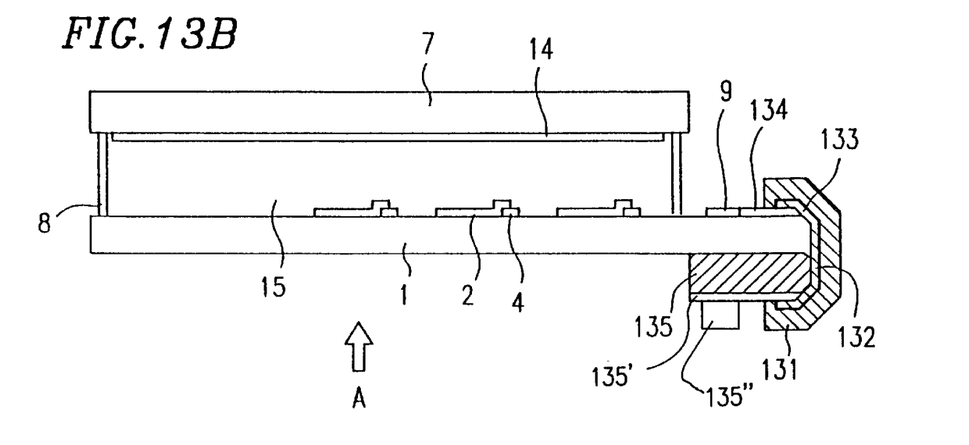
FIG. 13B is a cross-sectional view taken along the line 13B–13B' of the liquid crystal display device shown in FIG. 13A.

FIG. 13A is a plan view of a liquid crystal display device in the second example of the present invention as seen from above, while FIG. 13B is a cross-sectional view taken along the line 13B–13B' of the liquid crystal display device shown in FIG. 13A.

The liquid crystal display device shown in FIG. 13A is of an active matrix type.

The liquid crystal display device shown in FIG. 13A includes two insulating substrates 1 and 7 like the liquid crystal display device shown in FIG. 5A. At least one of the insulating substrates 1 and 7 is a transparent substrate and both of the insulating substrates 1 and 7 are made of glass, quartz or the like. Each of the insulating substrates 1 and 7 has an upper surface, a lower surface and at least four side surfaces.

As shown in FIG. 13B, liquid crystal 15 is sandwiched between the upper surface (or the surface facing the liquid crystal 15) of the first insulating substrate 1 and the lower surface of the second insulating substrate 7.

A semiconductor thin film made of polycrystalline silicon is deposited on the upper surface of the first insulating substrate 1. The gate buses 5 and the source buses 6 are extended transversely through the adhesion surface of the seal member 8 to be connected to the output terminals of the corresponding drivers 9 and 10, respectively. The drivers 9 and 10 may be formed simultaneously with the switching elements 4 and the like by patterning or the like. The switching element 4 is a TFT element, an ITO element or the like.

External input terminals 134 are further provided and exposed on the upper surface of the first insulating substrate 1. As described below, the drivers 9 and 10 are connected to an external circuit board 135 via the external input terminals 134.

The external circuit board 135 includes a printed wiring board (PWB) 135' on which external circuits (e.g., controller 135") are provided. The external circuit board 135 is provided on the reverse surface of the first insulating substrate 1. More specifically, the external circuit board 135 is located on the reverse surface of the first insulating substrate 1 so as to correspond to the positions of the drivers 9 and 10. In other words, the external circuit board 135 is provided in such a region on the reverse surface (on which the switching elements 4 are not mounted) of the first insulating substrate 1 that can prevent light from being incident onto the switching elements 4 through the reverse surface.

In the case where light is incident from the direction A shown in FIG. 13B, the light is blocked by the external circuit board 135, so that the light does not reach the drivers 9 and 10. As a result, it is possible to suppress an optically excited current of the switching elements. Consequently, the element characteristics and the reliability can be improved and the display definition of the liquid crystal display device can be increased.

The output terminals (not shown) of the external circuit board 135 and the external input terminals 134 formed on the first insulating substrate 1 are connected via a cover 131. The cover 131 is a kind of engageable connectors and is engaged so as to cover a side of the first insulating substrate 1 and that of the external circuit board 135, thereby connecting them to each other.

The cover 131 is an insulating member having an elasticity and is preferably made of plastic. The cover 131 includes connector electrodes 132, which extend along the inner surfaces of the cover 131. A taper 133 is provided in the edge portion of the first insulating substrate 1.

Figure 14:
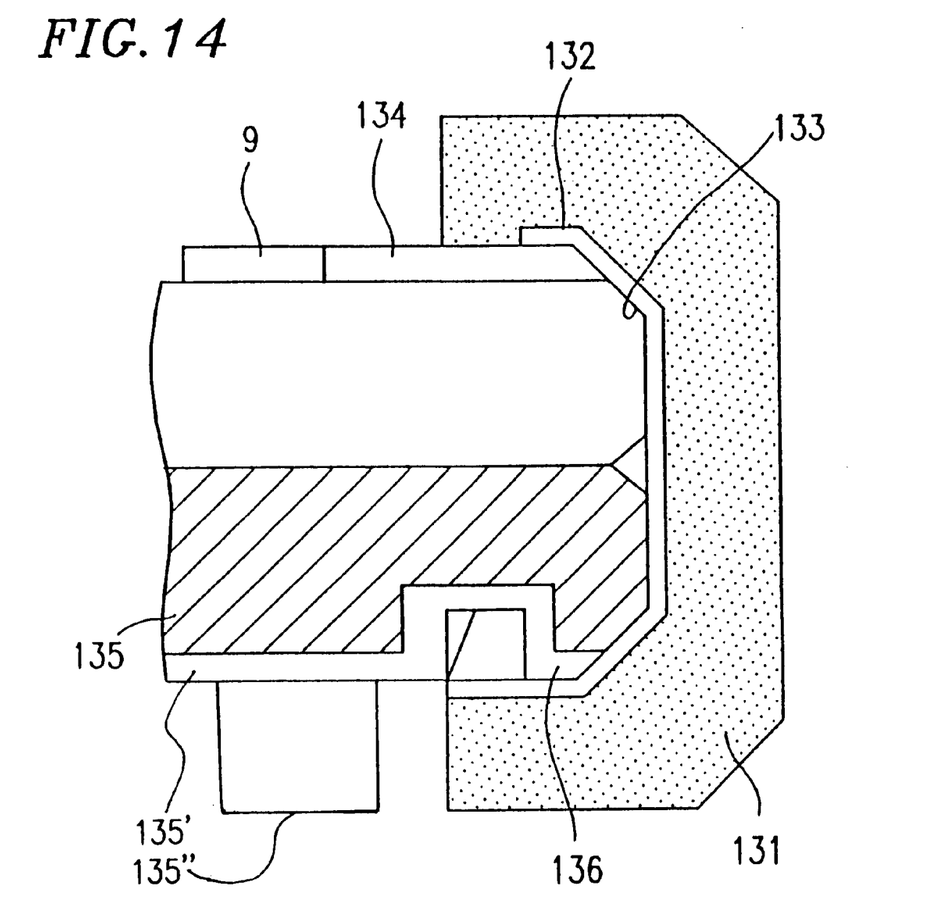
FIG. 14 is an enlarged cross-sectional view showing a part of the liquid crystal display device shown in FIG. 13A.

FIG. 14 is an enlarged view of the end portions of the first insulating substrate 1 and the external circuit board 135 which are sandwiched by the cover 131. A taper may also be provided in the edge portion of the external circuit board 135 as shown in FIG. 14.

Figure 15:
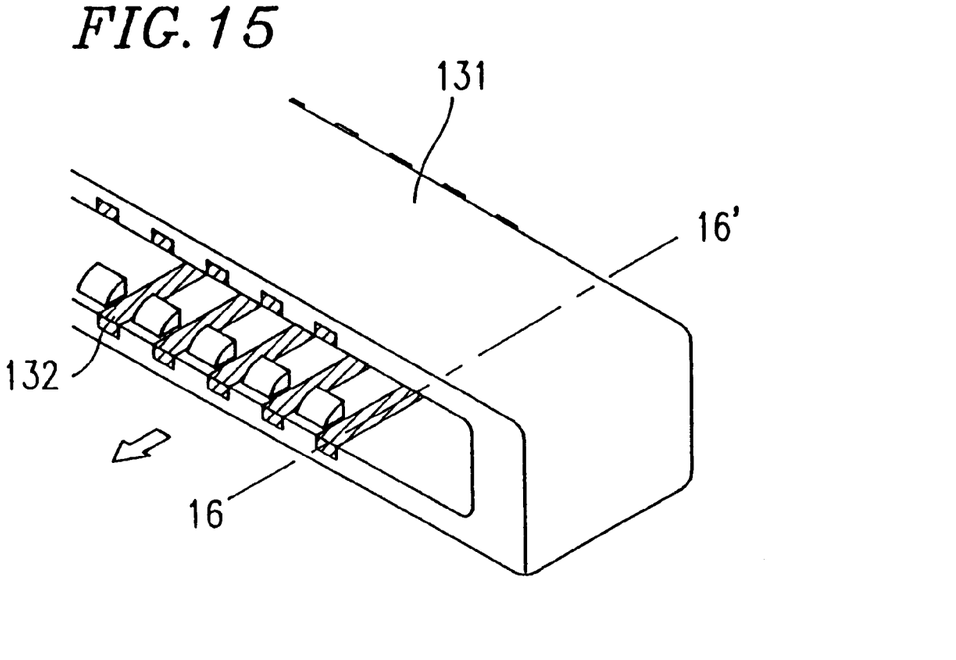
FIG. 15 is a perspective view of an exemplary cover according to the present invention.
Figure 16:
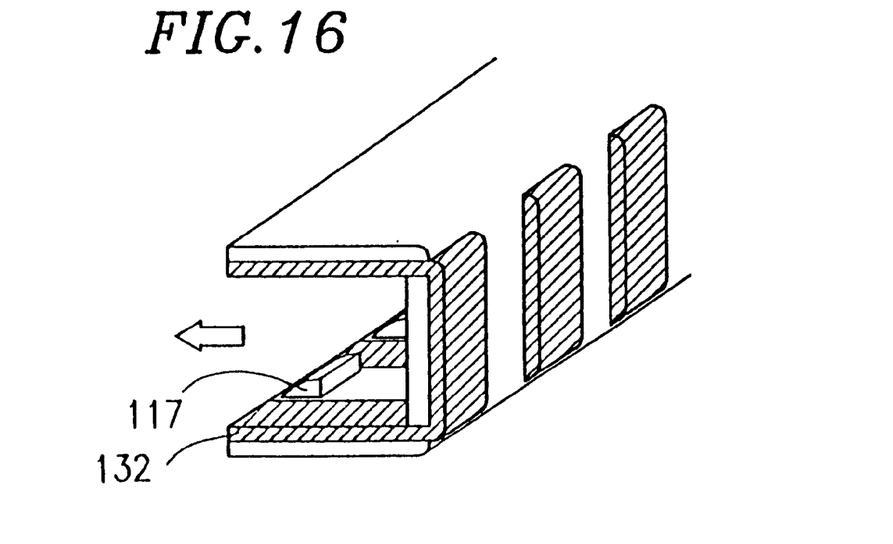
FIG. 16 is a cross-sectional perspective view taken along the line 16–16' of the cover shown in FIG. 15.

FIG. 15 is a perspective view of an exemplary cover, while FIG. 16 is a cross-sectional perspective view taken along the line 16–16' of the cover shown in FIG. 15.

In the cover 131 shown in FIG. 14, connector electrodes 132 extend on inner surfaces of the cover 131. However, the connector electrodes 132 may be provided at any other positions so long as the connector electrodes 132 can electrically connect the external input terminals 134 and the output terminals 136 to each other. For example, the connector electrodes 132 are not always required to extend on inner surfaces of the cover 131 as shown in FIGS. 15 and 16.

As described above, in the liquid crystal display device in this second example, by connecting the external input terminals 134 on the first insulating substrate 1 and the output terminals 136 on the external circuit board 135 via the cover 131 or an engageable connector, the mounting process can be simplified. Alternatively, after the first insulating substrate 1 and the external circuit board 135 are adhered to each other via an adhesive, the first insulating substrate 1 and the external circuit board 135 may be fixed by the cover 131.

Since the cover 131 is an engageable connector, it is easy to process the connector. The cover 131 can also function as a protective frame for the first insulating substrate 1 and the external circuit board 135.

Since the cover 131 has an elasticity, the first insulating substrate 1 and the external circuit board 135 can be surely connected to each other, so that a failure is not caused in the connection between the external input terminals 134 and the output terminals 136.

Since a taper 133 is provided in an edge portion of the first insulating substrate 1, it is unlikely that the damage of the connector electrodes 132 causes unsatisfactory electrical communication. In addition, since the taper 133 has already been provided for the first insulating substrate 1, the entire portion of the first insulating substrate 1 is not damaged by the contact of the edge of the first insulating substrate 1 with the cover 131. It is noted that the tapers 133 may be provided in both edge portions of the first insulating substrate 1. The taper 133 may also be provided in the edge portion of the external circuit board 135.

Since the external circuit board 135 is provided on the reverse surface of the first insulating substrate 1 so as to face the drivers 9 and 10, the size of the liquid crystal display device shown in FIGS. 13A and 13B can be smaller than that of the liquid crystal display device shown in FIG. 3.

By providing a concave portion in the reverse surface of the external circuit board 135 and a convex portion for the engageable connector and engaging these portions with each other, the external circuit board and the lower insulating substrate can be electrically connected to each other more surely and the mechanical strength thereof can be increased.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:
   a first substrate having a first surface and a second surface; a second substrate having a surface opposed to the first surface of the first substrate; a liquid crystal layer interposed between the first surface of the first substrate and the surface of the second substrate; a plurality of pixel electrodes; a plurality of switching elements, each of the switching elements supplying a signal to a corresponding one of the plurality of pixel electrodes; drivers for driving the plurality of switching elements; a controller for controlling the drivers; and
   a plurality of connection lines which are used by the controller for supplying to the drivers a signal for controlling the drivers, a part of the plurality of connection lines being located on a side surface of the first substrate, and
   wherein the drivers are provided on the first surface of the first substrate,
   and wherein the controller is provided above the second surface of the first substrate.

2. A liquid crystal display device according to claim 1, wherein the connection lines are printed wiring.

3. A liquid crystal display device according to claim 2, wherein the printed wiring is made of carbon paste.

4. A liquid crystal display device according to claim 2, wherein the printed wiring is made of silver paste.

5. A liquid crystal display device according to claim 1, wherein the controller is adhered to a peripheral portion other than a screen region above the second surface of the first substrate.

6. A liquid crystal display device according to claim 1, wherein the controller is provided on a control substrate, which is adhered to a peripheral portion other than a screen region above the second surface of the first substrate.

7. A liquid crystal display device according to claims 6, wherein the control substrate is connected to the second surface of the first substrate via an anisotropic conductive film.

8. A liquid crystal display device according to claim 6, wherein the control substrate is connected to the second surface of the first substrate via solder.

9. A liquid crystal display device according to claim 1, wherein the driver is formed on the first surface of the first substrate by a monolithic method.

10. A liquid crystal display device according to claim 1, wherein the driver is formed on the first surface of the first substrate by a COG method.

11. A liquid crystal display device according to claim 1, wherein the connection lines are coated with a resin.

12. A liquid crystal display device comprising:
    a first substrate having a first surface, a second surface and at least four side surfaces; a second substrate having a surface opposed to the first surface of the first substrate; a liquid crystal layer interposed between the first surface of the first substrate and the surface of the second substrate; a plurality of pixel electrodes; a plurality of switching elements, each of the switching elements supplying a signal to a corresponding one of the plurality of pixel electrodes; drivers for driving the plurality of switching elements; and a controller for controlling the drivers,
    wherein the drivers are provided on the first surface of the first substrate and the controller is provided above the second surface of the first substrate, thereby allowing an area of a peripheral region other than a liquid crystal display region of said first substrate to be reduced to thereby reduce said liquid crystal display device's size, and
    wherein the controller is provided on an external circuit board which is in contact with the second surface of the first substrate and a cover for fixing the external circuit board and the first substrate is further provided for the liquid crystal display device.

13. A liquid crystal display device comprising:
    a first substrate having a first surface and a second surface; a second substrate having a surface opposed to the first surface of the first substrate; a liquid crystal layer interposed between the first surface of the first substrate and the surface of the second substrate; a plurality of pixel electrodes; a plurality of switching elements, each of the switching elements supplying a signal to a corresponding one of the plurality of pixel electrodes; drivers for driving the plurality of switching elements; a controller for controlling the drivers; and
    wherein the controller is provided on an external circuit board which is in contact with the second surface of the first substrate and a cover for fixing the external circuit board and the first substrate is further provided for the liquid crystal display device, and the cover is an engageable connector.

14. A liquid crystal display device according to claim 13, wherein the cover is made of plastic.

15. A liquid crystal display device according to claim 13, wherein the edge portions of the first substrate have a taper shape.

16. A liquid crystal display device according to claim 13, wherein the external circuit board is a printed wiring board.

17. A liquid crystal display device according to claim 13, wherein the external circuit board is provided so as to face the drivers via the first substrate.

18. A liquid crystal display device comprising:
    a first substrate having a first surface and a second surface; a second substrate having a surface opposed to the first surface of the first substrate; a liquid crystal layer interposed between the first surface of the first substrate and the surface of the second substrate; a plurality of pixel electrodes; a plurality of switching elements, each of the switching elements supplying a signal to a corresponding one of the plurality of pixel electrodes; drivers for driving the plurality of switching elements; a controller for controlling the drivers; and wherein the controller is provided on an external circuit board which is in contact with the second surface of the first substrate and a cover for fixing the external circuit board and the first substrate is further provided for the liquid crystal display device, and the cover electrically connects the controller and the driver to each other.

19. A liquid crystal display device according to claim 18, wherein the cover is made of plastic.

20. A liquid crystal display device according to claim 18, wherein the edge portions of the first substrate have a taper shape.

21. A liquid crystal display device according to claim 18, wherein the external circuit board is a printed wiring board.

22. A liquid crystal display device according to claim 18, wherein the external circuit board is provided so as to face the drivers via the first substrate.

23. A method for producing a liquid crystal display device which comprises:

a first substrate having a first surface and a second surface; a second substrate having a surface opposed to the first surface of the first substrate; a liquid crystal layer interposed between the first surface of the first substrate and the surface of the second substrate; a plurality of pixel electrodes; a plurality of switching elements, each of the switching elements supplying a signal to a corresponding one of the plurality of pixel electrodes; drivers for driving the plurality of switching elements; and a controller for controlling the drivers, the method comprising the steps of:

providing the drivers on the first surface of the first substrate;

providing the controller above the second surface of the first substrate; and connecting the drivers to the controllers, and wherein the step of connecting the drivers to the controller further comprises a step of printing a plurality of connection lines on a side surface of the first substrate.

24. A liquid crystal display device comprising:

a first substrate having a first surface, a second surface and at least four side surfaces; a second substrate having a surface opposed to the first surface of the first substrate; a liquid crystal layer interposed between the first surface of the first substrate and the surface of the second substrate; a plurality of pixel electrodes; a plurality of switching elements, each of the switching elements supplying a signal to a corresponding one of the plurality of pixel electrodes; drivers for driving the plurality of switching elements; a controller for controlling the drivers; and a plurality of connection lines which are used by the controller for supplying to the drivers a signal for controlling the drivers, a part of the plurality of connection lines being located on at least one of the at least four side surfaces, and wherein the drivers are provided on the first surface of the first substrate, and wherein the controller is provided above the second surface of the first substrate.

25. A liquid crystal display device according to claim 24, wherein at least one of an edge portion in which at least one of the at least four side surfaces and the first surface of the first substrate cross is chamfered, and an edge portion in which at least one of the at least four side surfaces and the second surface of the first substrate cross is chamfered.

* * * * *